United States Patent [19]

Rusterholz

[11] 3,955,853

[45] May 11, 1976

[54] SELF-CONTAINED DEVICE FOR THE PNEUMATIC CONVEYANCE OF INCOHERENT SOLID MATERIALS WITH A MODULAR TAKEUP DEVICE AND VALVE MEANS

[76] Inventor: Otto Rusterholz, Via G. A. Borgese 14, Milan, Italy

[22] Filed: Nov. 7, 1974

[21] Appl. No.: 521,810

[30] Foreign Application Priority Data

Nov. 15, 1973 Italy .................................. 31322/73
Oct. 29, 1974 Italy .................................. 28894/74

[52] U.S. Cl. .................................. 302/17; 302/24; 302/26; 302/53
[51] Int. Cl.² .................................. B65G 53/58
[58] Field of Search ............ 302/2 R, 17, 21, 24–27, 302/39, 41, 52, 53

[56] References Cited
UNITED STATES PATENTS
3,871,711  3/1975  Rusterholz ............................ 302/26

*Primary Examiner*—Evon C. Blunk
*Assistant Examiner*—Jeffrey V. Nase
*Attorney, Agent, or Firm*—Frank J. Jordan

[57] ABSTRACT

A self-contained device for the pneumatic conveyance of incoherent solid materials by pneumatic pulse waves is disclosed, the improvement consisting in that a container for the material is provided with a feeding point for a pressurized gas, first and second valve means being also provided for alternately intercepting the flow of the material into the initial trunk of the conveyance line on the one hand, and the vent of the gaseous fluid and the flow of the solid material on the other hand. A second gas-feeding point is also provided to supply impulsive gas jets in alternate sequence with the pulses of said first-named feeding point. A dust takeup device is provided, having a reservoir placed in intermediate points of the conveying pipeline and functionally connected with valve means which act also as dust-collecting and dust-discharging means. The advantage of the device is that, especially for incoherent materials which are difficult to handle due to the high production of dust, the task of the filters is relieved and filter-clogging is efficiently prevented.

14 Claims, 9 Drawing Figures

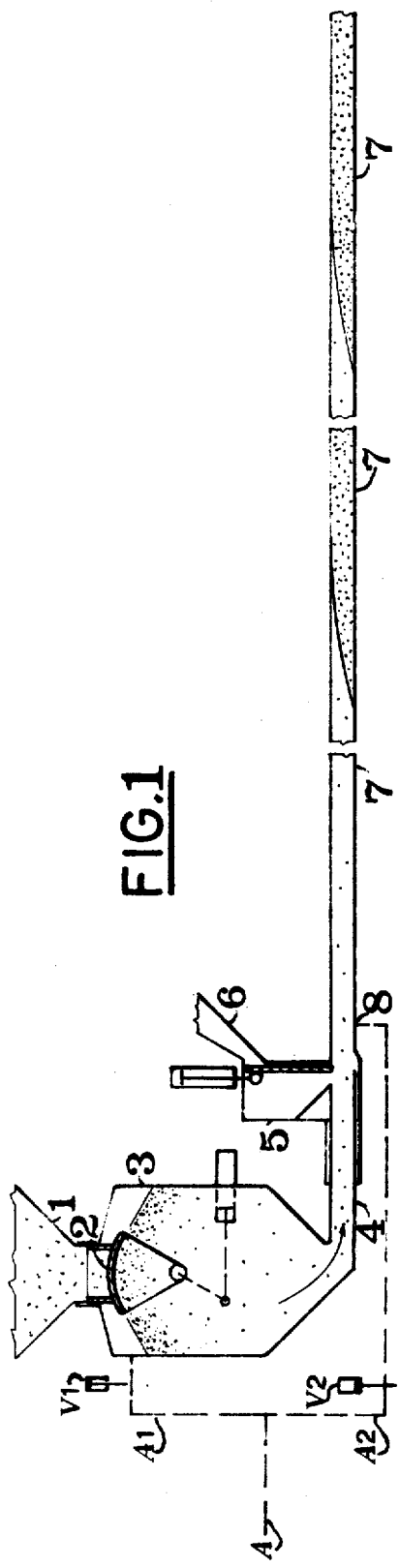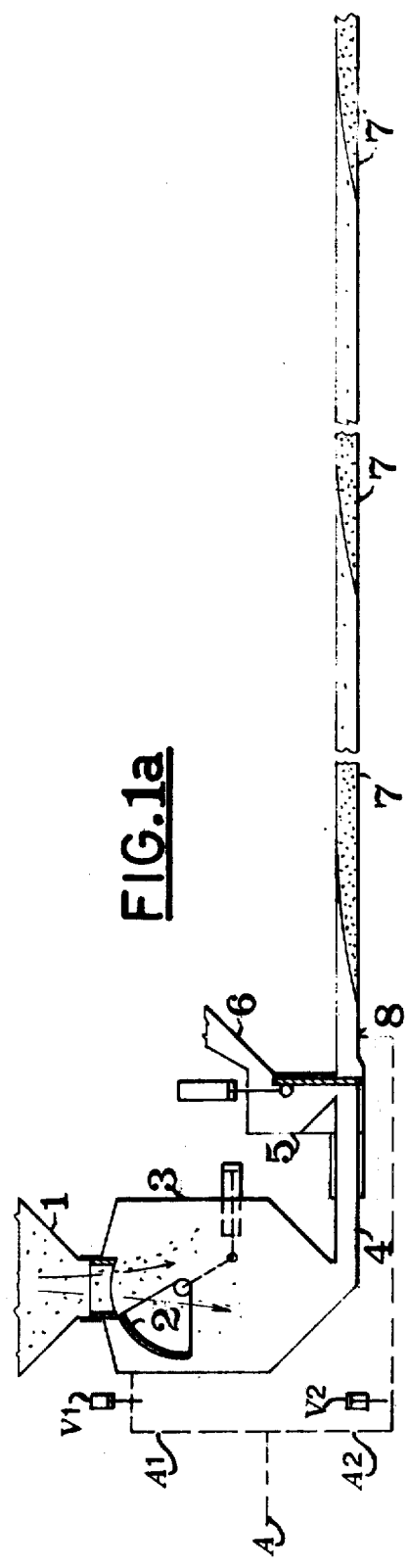

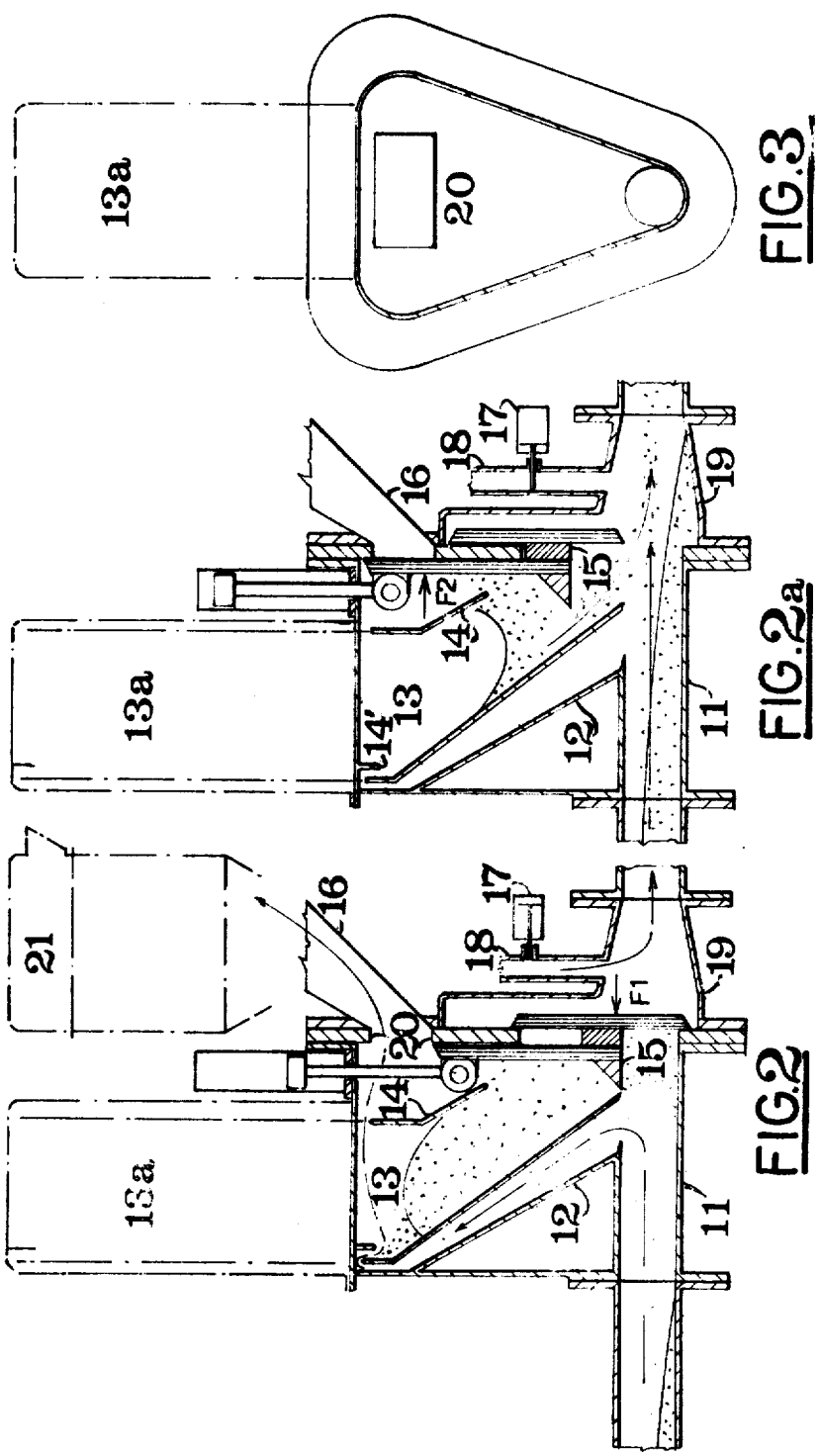

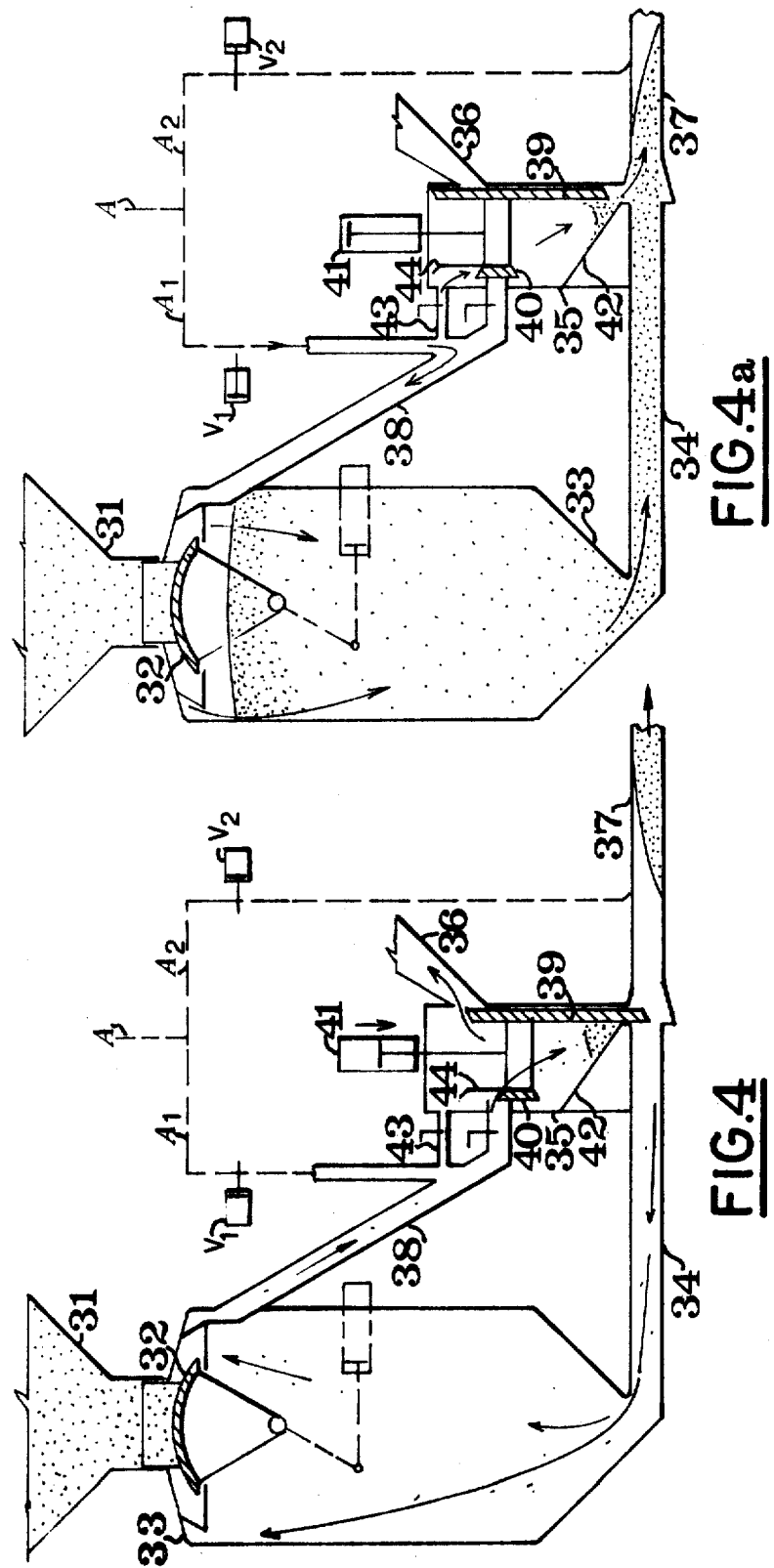

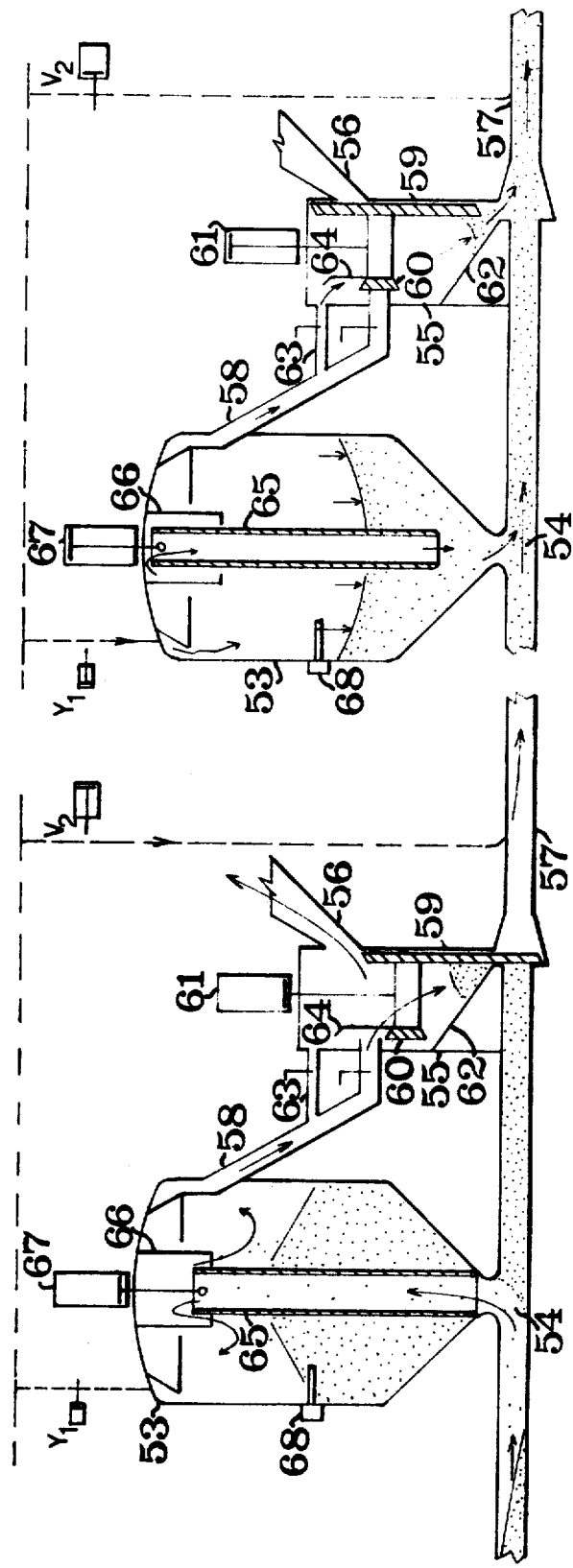

SELF-CONTAINED DEVICE FOR THE PNEUMATIC CONVEYANCE OF INCOHERENT SOLID MATERIALS WITH A MODULAR TAKEUP DEVICE AND VALVE MEANS

BACKGROUND OF THE INVENTION

This invention relates to a self-contained device for the pneumatic conveyance of incoherent solid materials, with a modular takeup device and valve means.

CROSS-REFERENCE TO RELATED APPLICATIONS

In the copending patent application Ser. No. 343,273 filed on the Mar. 21, 1973, now U.S. Pat. No. 3,871,711 issued Mar. 18, 1975 there had been disclosed and claimed a method and a device for the pneumatic conveyance of incoherent solid materials, which was essentially characterized by the pneumatic conveyance of such materials by pneumatic pulse waves.

FIELD OF THE INVENTION

The principal object of the present invention is to provide a self-contained device for the pneumatic conveyance of incoherent solid materials according to the method of the above cited patent application, said device being particularly suited for discharging incoherent solid materials from containers of any kind whatsoever, such as silos, cisterns, aircraft fuselages, tanks, etc., or from any source whatsoever, without any necessity of pressurizing the container and in such a way as to permit the discharge of the material and its pneumatic delivery in a direct way.

Another object of the present invention is to have the materials advancing in an impulsive way, due to the pulses which are imparted to the material without having virtually any stoppage of the material on account of a particular adjustment of the centralized control means: more particularly, the motion of the material is still a sine-wave phenomenon, but, by properly selecting the frequency of the pulses and exploiting the inertia of the material, the same is continually accelerated and decelerated and the small heaps continually advance along the pneumatic conveyance pipeline but with a uniform motion. Considerable rates of flow can thus be obtained and the discharge of a container which should be emptied of its contents can noticeably be accelerated.

SUMMARY OF THE INVENTION

To build the self-contained device according to this invention, there are provided a container having at least a feed point for a compressed gaseous fluid as fed in an impulsive way, a first valve means alternately intercepting the flow of the material entering the initial pipe section connected to the bottom of the container, and a second valve means for alternately intercepting the venting of the gaseous fluid and the flow of the material, and a second point for feeding the gaseous fluid as fed in an impulsive way alternately with said first fluid feed point, said second feed point being located immediately downstream of said second valve means, the device being completed by a pipe section open at its discharge end at the point where the material of the container is to be discharged.

Advantageously, said first valve means will be a gate for intermittently intercepting, in attunement with the impulsive feed of the gaseous fluid into said first feed point, the descent of the incoherent solid material into said container.

According to a preferred embodiment of the above referred to self-contained device, a bypass duct is further provided to establish a communication between the top portion of said material-feeding container and said first and second valve means in certain instants of time of the working cycle.

Another object of the present invention is to provide a modular takeup device for said incoherent solid materials, said takeup device being intended for being inserted, with its attendant valve means, in intermediate points of a pneumatic conveyance installation according to the patent application aforementioned.

In its most general form, said takeup device essentially comprises a takeup space or chamber for depositing the conveyed material, the top portion of said chamber being able to be cyclically put in communication through a duct with the pneumatic line for conveying the material, and a two-position intercepting member adapted to intercept, in a first position, the conveyance pipeline and the descent of the solid material from said takeup chamber into the pneumatic conveyance pipeline, while the vent for the gas is left open from the top portion of said chamber, and, in a second position, to intercept the vent of the gas while the descent of the solid material from the takeup chamber to the pneumatic conveyance line and the flow of the carrier fluid and of the material carried thereby into the pneumatic conveyance line become free.

According to a first embodiment, the takeup device has the communication duct between the pneumatic conveyance line and the top portion of the takeup chamber constituted by a deflection channel placed in a direction which is generally slanting with respect to the axis of the conveyance line for the incoherent solid material, said channel and said takeup chamber having a wall in common.

According to a second embodiment, the communication duct between the pneumatic conveyance line and the top portion of the takeup chamber is a tube which can either be lifted or lowered in attunement with the lifting and lowering of said interception member, a bypass duct being further provided to establish a communication between the top of the takeup chamber and the body of said two-position intercepting member.

BRIEF DESCRIPTION OF THE DRAWINGS

The invention will be better understood in its most important aspects in the ensuing description of a few preferred embodiments, given by way of nonlimiting example only and illustrated in the accompanying drawings, wherein:

FIGS. 1 and 1a show the self-contained device for pneumatic conveyance in two working positions, and exactly with the interception member for the conveying pipeline in the open and the closed position, respectively.

FIGS. 2 and 2a diagrammatically show the takeup device in two positions, that is, with the valve member in the closed position (lowered) and open (lifted), respectively.

FIG. 3 is a diagrammatical cross-sectional view of FIGS. 2 and 2a.

FIG. 4 is a self-contained pneumatic conveyance device in the position at which the closing stage of the conveyance line is being started by means of the gate placed on same line.

FIG. 4a shows the device of FIG. 4, but in the position where the gate has been completely opened.

FIG. 5 shows a dust takeup and recovery device to be inserted in intermediate points of a line, in the position in which the conveyance line is intercepted, and FIG. 5a shows the device of FIG. 5 in the position it takes when the conveyance line is not intercepted.

DESCRIPTION OF THE PREFERRED EMBODIMENTS

Having now reference, at the outset, to FIGS. 1 and 1a, it will be seen that the characteristic members of the device are: a container having any desired shape and volume, 1, an input gate 2 for the material to enter the device, said gate being able to be either opened or closed intermittently in reverse attunement with the opening and closing of the valve means which intercepts the conveyance pipeline 7, a point of intermittent feed for the material 3 which has the shape of a reservoir underlying the container 1, a line A for feeding the compressed gas, said line branching into two trunks, A1 and A2. The trunk A1 opens into the reservoir 3 near the top thereof, whereas the trunk A2 reaches a point of the piping 7 immediately downstream of the valve means 5, having a vent 6 for the gas. Two valves V1 and V2 control the alternate introduction of the gas in an impulsive way to either trunk A1 or A2, also in an alternate way, so that when the valve V1 is open, the valve V2 is closed, and vice versa, the whole assembly being properly controlled in quite conventional a way.

In the light of the foregoing, by observing the FIGS. 1 and 1a, it can readily be seen how the self-contained device in question works. As a matter of fact (FIG. 1), as soon as the gate 2 is closed, gas is fed into the trunk A1 by opening the valve V1 and thus the solid material held in 3 is pushed into the initial section 4 of the pipeline and goes on, beyond the valve means 5, along the pipeline 7. Obviously, the valve means 5 is open and concurrently closes the vent 6 for the gas, while the valve V2 is obviously closed.

In the position of FIG. 1a, conversely, as soon as the valve V1 is closed, the valve means 5 is closed and the vent 6 for the gas is simultaneously opened and the gate 2 is opened. Meanwhile, the valve V2 has been opened and the impulsive gas jet can feed the point 8, as clearly seen in the drawings, for feeding the gas in immediately downstream of 5. By so doing, the material continues to proceed along the pipeline 7, that is, the small heaps of material go on with an accelerate motion and are decelerated according to a sinusoidal trend and, by properly selecting the frequency of the working cycle, it is even possible, by exploiting, in addition, the inertia of the material as outlined above, to obtain, in practice, that the small heaps of material are never stopped during the entire working time of the installation in question. To select either way of operation is a mere question of adjustment according to the requirements which from time to time govern.

In FIGS. 2 and 2a there has been shown a takeup device for the incoherent solid material to be conveyed, which completes the valve means according to the copending patent application aforementioned.

It comprises a deflection channel, 12, placed in a direction which is generally slanting with respect to the axis of the conveyance pipeline 11. Said channel is tapered upwards, as seen in FIG. 2, and has a wall in common with a takeup chamber 13. There are also provided two baffles 14 and 14' placed generally downstream of the deflection channel. A two-position intercepting member, as properly controlled, closes, in the position of FIG. 2, the chamber 13 at the bottom, so that the material is prevented from falling into the pipeline 11 again. Simultaneously, the member 15 leaves the vent 16 for the gas open and bars the pipeline 11. Meanwhile pressurized gas is fed through the feed point 18 as controlled by a valve 17 which is now open. It is fitting to observe that the pressure of the fluid fed through 18 presses the closure member of 15 against its seating so that the tight seal is perfect. This fact is summarized by the arrow F1 of FIG. 2. Atop the takeup device there can be an enlarged headroom 13a which is a volume storage to contain, if required, a whole jet of material, the term "jet" being intended to indicate the amount of solid material as conveyed by a pressure pulse of the carrier gas. Above the vent 16 for the gas, there can be provided, with advantage, a filter 21 to retain the dust which possibly escaped from the chamber 13.

In FIG. 2a the interception member 15 is lifted and thus the vent 16 for the gas is closed, the incoherent solid material can fall from the chamber 13 into the conveyance pipeline 11 again and the pipeline is no longer intercepted downstream, so that the carrier fluid and the material can go forward. Meanwhile, the feeding in of gas through 18 is discontinued inasmuch as the valve 17 is closed. The gas pressure now obtaining within the chamber 13 can act upon the gate which closes the vent 16 and the tight seal is ensured. This fact is indicated by the arrow F2 of FIG. 2a. The pipeline section 19 downstream of the interception device 15 has been shown tapered: this is an advantage, but is in no wise compulsory. The numeral 20 indicates, in the cross-sectional view of FIG. 3, the window formed through the valve body in order that the gas may emerge towards the vent 16.

By so doing, a simple and reliable device has been embodied to take up the powder which could be possibly stored upstream of the interception device. It is also useful to observe that the tight seal is always reliably provided irrespective of the nature of the material to be conveyed, and, within a certain range, also of that of the material forming the gating members proper (gates) since the pressure of the gas is exploited to ensure a tight seal as has been explained hereinabove.

Having now reference to FIG. 4, it is noted that a feeding hopper 31 opens into a reservoir 33 as placed at the initial point of the pipeline, and the communication therebetween can either be opened or closed by an input gate 32 or any other equivalent means. At 34 there is the initial portion of the discharge line 37 for the incoherent (or dusty) material. By the agency of a bypass duct 38, the reservoir 33 communicates with the interception gate 35, which has a movable member 39–40, whose portion 39 can alternately open the vent 36 and intercept the line 37, or vice versa, that is to say, open the line 37 and close the vent 36. Integral with the member 39, there is a member 40, already named above: this is capable of establishing, or not, a communication between the reservoir 33 and the interior of the valve 35. Within the body of the valve 35, and exactly in the bottom portion thereof, there is an inclined plane, 42, which can communicate with the line 37 when the valve means 39 is lifted, and cannot communicate therewith in the reverse situation. As can be seen in FIGS. 4 and 4a, the members 39 and 40, integral with one another, are controlled by a control member 41 which is attuned with the operation of the pneumatic conveyance line. As a matter of fact, FIG. 4 shows a feeding line A for compressed air (or any equivalent fluid) and the two trunks A1 and A2 branching off therefrom. Said two trunks reach, respectively, the valve V1 opening into the duct 38 and the valve V2 which reaches the line 37 to urge forward the incoherent solid material.

By observing FIG. 4 again, it can be seen that, while the closing movement of the valve 39–40, the valves V1 and V2 are already closed, the passageway between the inclined plane 42 and the line 37 is about to be closed, the vent 36 (which can open into a filter) is about to be opened and the lower opening of the bypass duct 38 is about to be opened.

Air subjected to the residual pressure thus flows back into the reservoir 33 in a direction which is contrary to the normal advance motion of the air and the incoherent material, and, from 33, through the bypass duct 38, can enter the body of the valve 35 and the dust in suspension in the air can be deposited on the inclined plane 42 and can also go, in part, through the duct 36, to a filter. It is apparent that the task of the filter, if any, is considerably facilitated since a major fraction of the duct has been able to fall both in the reservoir 33 and the valve chamber 35 and thus a minor fraction only of the dust entrained by the fluid backflow will be passed through the vent 36 and thence to the filter.

In FIG. 4a, with the valve member 39 lifted and the vent 36 closed, opening the valve V1 causes a main airstream to flow towards the reservoir 33 through the bypass duct 38. This stream entrains the material held in 33 and conveys same along the line 37. The line which goes from the valve V1 to the bypass duct 38 can have a further branching off 43 entering the top portion of the valve 35, as viewed also in FIG. 4: likewise, the valve member 39–40 can have a baffle 44 integral therewith. Concurrently, through the branching off 43, there can enter into the valve body 35, a secondary airstream, to push the dust as collected on the inclined plane 42, directed into the line 37. The vent 36 is closed, as aforesaid, and as it should be to make the conveyance of the incoherent material along the conveyance pipeline 37 possible. Throttling members can be provided on the branching off 43 and near the lower portion of the bypass duct 38: these members can be seen, diagrammatically but unreferenced, in FIGS. 4 and 4a.

Summing up, in the position of FIG. 4, which shows the instant of time at which the discharge of the amount of material held in the reservoir 33 has been completed, the valves V1 and V2 are closed, and the gate assembly 39–40–44 is being lowered by the agency of the piston 41.

In the position of FIG. 4a, conversely, there is shown the initial instant of time of the ejection from the reservoir 33 of the material held therein: the valve V1 is open, the valve V2 is still closed, and the assembly 39–40–44 is thoroughly lifted.

The device shown in FIGS. 5 and 5a embodies the same ideas as outlined above, that is, the aim to spare to the utmost the filters by preventing their premature clogging, and is concerned with intermediate points of a long pneumatic conveyance line.

Along the conveyance line 57, and always upstream of a valve gating assembly such as 55, a dust takeup and recovery system is arranged. The task of such a system is to tender a takeup possibility so as to be less bound to the accuracy of the timing of the carrier fluid jets for pushing the material forward, and also to be freed from certain inherent properties of the product to be conveyed. Such a takeup device can be located, for example, every 200 meters of conveyance line.

By observing now FIG. 5, it is noted that, in an area 54 upstream of the valve assembly 55 on the conveyance line 57, a takeup reservoir 53 is mounted. This reservoir has its end portion tapering downward and its lower opening, placed in the area 54 aforesaid, is a restricted section to which the bottom end of a tube 65 can be snugly adapted: the top end of 65 is preferably surrounded by a tubular baffle 66. When, as viewed in FIG. 5, the tube 65 is adapted to the lower opening of 53, the line 57, and exactly its area 54, is put in direct communication with the top portion of the takeup chamber or reservoir 53. In the position of FIG. 5a, conversely, the tube 65 is lifted and the material contained in 53 can fall into the line 57, or, more exactly, in the area 54 thereof.

It is fitting to observe, at the outset, for a better understanding of the construction and operation of the whole assembly, that when the tube 65 is lifted, also the interception gate 59 and the valve members 59–60–64 are lifted, and, inversely, when the gate 59 is lowered with the members integral therewith, also the tube 65 is lowered and establishes the aforementioned communication between the line 57 and the top portion of the takeup reservoir 53. In addition, the top portion of the reservoir 53 communicates, through the bypass 58, with the body of the valve 55, both directly, and also through a branching off 63. The valve members 64-5-9–60 are the exact counterpart of the members 44-3-9–40 whose construction and operability have already been described in connection with FIGS. 4 and 4a. The piston 61 is equivalent to the piston 41 of FIGS. 4 and 4a, and the branching off 63 corresponds to the branching off 43 of FIGS. 4 and 4a. The valve V2 of FIGS. 5 and 5a is equal to, and operates exactly in the same way as, the valve V2 of FIGS. 4 and 4a, whereas in FIGS. 5 and 5a a valve Y1 is provided for the possible intake of compressed air in the emptying stage of the takeup reservoir 53 (see more particularly the position of FIG. 5a). In the position of FIG. 5, with the valve V2 open, the conveyance line 57 is intercepted, while the bypass duct 58 communicates with 53 and with the valve 55. From the area 54 of the line 57, dust-entraining air flows into the lowered tube 65 and thus into 53. The dust is deposited partly at 53 and partly it goes on, through 58, to enter the valve body 55. A fraction of the dust which reached 55 emerges through the vent duct 56 (equivalent to 36 of FIGS. 4 and 4a), whereas the remaining fraction falls on the inclined plane 62 (equivalent to 42 of FIGS. 4 and 4a). As a matter of fact, the vent 56 is open and gives access to a filter (not shown), whereas the member 59 intercepts, in addition to the line 57, also the communication of the inclined plane 62 with the line 57. In addition, as has been seen, the communication between the valve 55 and the takeup reservoir 53 is open, whereas the branching-off 63 is always open in any case, thus also in the position of FIG. 5a.

Actually, in FIG. 5a the position is shown where the line 54–57 is free inasmuch as the valve V2 is closed and the valve 55 is open. As a matter of fact, through the piston 61 (which was lowered in FIG. 5) the movable members of the valve 55 had been lifted and the vent 56 had been closed; the member 60 had closed the bypass duct 58. The material which is now present in the takeup reservoir 53 can fall, under the gravity pull and with the possible aid of a flow of compressed air (valve Y1) and, concurrently, the material which was on the inclined plane 62 also falls into the line 57 and is urged forward, and the vent 56 is closed. There can be provided, integrally with the member 60, a baffle 64 which operates exactly as the baffle 54 already described in FIGS. 4 and 4a. The piston 67 for lifting the tube 65 and lowering same is synchronized with the piston 61 which actuated the gating assembly which has already been described. It can be an advantage to provide a volume for the reservoir 53 which is nearly corresponding to the volume of dusty or incoherent material dragged by a single compressed air pulse in 57: this, however, is not vital, since the volume of 53 can be any optional volume. It could be useful, too, though not strictly necessary, to place a detector 68 for the maximum level of the material stacked in 53.

What is claimed is:

1. An apparatus for pneumatically conveying incoherent solid material along a pipeline by pulses of compressed gas, comprising means for intermittently feeding said incoherent solid material to said pipeline, a first valve means on said pipeline operable between an open position providing flow of incoherent solid material through said pipeline and to a closed position to preclude flow of said incoherent solid material through said pipeline, a container having means connecting said container to said pipeline, a vent leading from said container, a second valve means movable to an open position to effect venting of said container and to a closed position to preclude venting of said container, means for feeding compressed gas to said pipeline downstream of said first valve means, said first and second valve means opening simultaneously such that when said first valve means is in its closed position, said second valve means is in its open position and when said first valve means is in its open position said second valve means is in its closed position, and operable means for feeding at least some of said incoherent solid material to said container when said first valve means is in said closed position and for feeding the incoherent solid material in said container to said pipeline when said first valve means is in said open position.

2. An apparatus according to claim 1 wherein passageway means are provided between said container and said pipeline, said first valve means when in its closed position being operable to close of said passageway means to preclude flow of incoherent solid material from said container to said pipeline and to simultaneously preclude flow of said incoherent solid material through said pipeline.

3. An apparatus according to claim 2 wherein said container is a collection container for said incoherent solid material, said collection container having an inclined surface on which said incoherent solid material is received, said passageway means leading from said inclined surface to said pipeline.

4. An apparatus according to claim 1 including means joining said first and second valve means as a single valve unit, and actuating means for operating said single valve unit between open and closed positions.

5. An apparatus according to claim 1 wherein said means for intermittently feeding said incoherent solid material to said pipeline comprises a vessel, a conduit leading from said vessel to said pipeline at a location of the latter upstream of said first valve means, and a bypass duct leading from said vessel to said container permitting gas laden with said incoherent solid material to pass from said vessel to said container.

6. An apparatus according to claim 5 including a third valve means operable between an open position to provide for flow through said bypass duct and to a closed position to preclude flow through said bypass duct, said third valve means being operatively connected to said first and second valve means such that said first, second, and third valve means are simultaneously operated as a unit.

7. An apparatus according to claim 6 further comprising a branch conduit between said bypass duct and said container providing communication between said bypass duct and said container, and a baffle means mounted on said third valve means and operable to be disposed in the flow path of said branch conduit when said third valve means is in said closed position, and means for throttling said bypass duct and said branch conduit.

8. An apparatus according to claim 5 further comprising means for feeding a compressed gas to said bypass duct.

9. An apparatus according to claim 5 further comprising actuating means operable between a first position for precluding flow of incoherent solid material from the bottom of said vessel to said pipeline while permitting gases to pass to the top portion of said vessel and to a second position permitting flow of incoherent solid material from the bottom of said vessel to said pipeline.

10. An apparatus according to claim 9 wherein said actuating means comprises a pipe within said vessel and having its longitudinal axis generally vertically disposed, and means for raising and lowering said pipe within said vessel between said first and second positions.

11. An apparatus according to claim 9 further comprising means for introducing compressed gas to said vessel.

12. An apparatus according to claim 1 wherein said operable means comprises a passage leading from said pipeline to an upper portion of said container, said passage leading from said pipeline at a position of the latter upstream of said first valve means.

13. An apparatus according to claim 12 wherein said passage is formed in part by an inclined surface on which incoherent solid material is collected in said container.

14. An apparatus according to claim 12 wherein said passage is slanted and has a tapered configuration.

* * * * *